United States Patent
Hebbalaguppe et al.

(10) Patent No.: US 10,831,360 B2
(45) Date of Patent: Nov. 10, 2020

(54) TELEPRESENCE FRAMEWORK FOR REGION OF INTEREST MARKING USING HEADMOUNT DEVICES

(71) Applicant: Tata Consultancy Services Limited, Mumbai (IN)

(72) Inventors: Ramya Sugnana Murthy Hebbalaguppe, Gurgaon (IN); Archie Gupta, Gurgaon (IN); Ehtesham Hassan, Gurgaon (IN); Jitender Maurya, Gurgaon (IN); RamaKrishna Perla, Gurgaon (IN)

(73) Assignee: Tata Consultancy Services Limited, Mumbai (IN)

( * ) Notice: Subject to any disclaimer, the term of this patent is extended or adjusted under 35 U.S.C. 154(b) by 187 days.

(21) Appl. No.: 16/019,146

(22) Filed: Jun. 26, 2018

(65) Prior Publication Data

US 2019/0026001 A1    Jan. 24, 2019

(30) Foreign Application Priority Data

Jul. 20, 2017 (IN) .............................. 201721025858

(51) Int. Cl.
*G06K 9/00*   (2006.01)
*G06F 3/0487* (2013.01)
(Continued)

(52) U.S. Cl.
CPC .......... *G06F 3/0487* (2013.01); *G06F 1/1686* (2013.01); *G06F 3/017* (2013.01);
(Continued)

(58) Field of Classification Search
None
See application file for complete search history.

(56) References Cited

U.S. PATENT DOCUMENTS

| | | | | |
|---|---|---|---|---|
| 8,325,982 B1* | 12/2012 | Moon | ................ | G06K 9/00771 |
| | | | | 348/169 |
| 2008/0181459 A1* | 7/2008 | Martin | ............... | G06K 9/00355 |
| | | | | 382/103 |

(Continued)

OTHER PUBLICATIONS

Susan R. Fussell, et al., "Gestures over video streams to support remote collaboration on physical tasks," Journal Human-Computer Interaction Institute, Sep. 2004, pp. 273-309; vol. 19, Issue 3, Publisher: ACM, Inc.

Wei-Sheng Wong et al., "A Virtual TouchPad for Smartphone with Depth Camera," 2015 IEEE International Conference on Consumer Electronics—Taiwan (ICCE-TW), Jun. 6-8, 2015, Publisher: IEEE.

*Primary Examiner* — Wei Wen Yang
(74) *Attorney, Agent, or Firm* — Finnegan, Henderson, Farabow, Garrett & Dunner LLP

(57) ABSTRACT

This disclosure relates generally to ROI marking, and more particularly to system and method for marking ROI in a media stream using touchless hand gesture interface such as headmount devices. In one embodiment, the method includes recognizing a pointing object representative of a gesture in frames of the media stream while capturing the media stream. The media stream comprises a scene captured from a first person view (FPV) of a user. Locus of the pointing object is detected in subsequent frames subsequent of the media stream to select a ROI in the media stream. The locus of the pointing object configures a bounding box around the ROI. The ROI is tracked in frames of the media stream occurring subsequent to the subsequent frames in the media stream. The bounding box is updated around the ROI based on the tracking, wherein the updated bounding box encloses the ROI.

15 Claims, 4 Drawing Sheets

(51) Int. Cl.
*G06F 3/01* (2006.01)
*G06K 9/32* (2006.01)
*G06K 9/20* (2006.01)
*G06F 3/03* (2006.01)
*G06F 1/16* (2006.01)
*H04N 19/167* (2014.01)
*G06T 7/70* (2017.01)

(52) U.S. Cl.
CPC ....... *G06F 3/0304* (2013.01); *G06K 9/00355* (2013.01); *G06K 9/2081* (2013.01); *G06K 9/3233* (2013.01); *G06T 7/70* (2017.01); *H04N 19/167* (2014.11); *G06K 9/00671* (2013.01); *G06T 2207/10016* (2013.01)

(56) References Cited

U.S. PATENT DOCUMENTS

| | | | |
|---|---|---|---|
| 2015/0077326 A1* | 3/2015 | Kramer | H04L 67/025 345/156 |
| 2016/0091976 A1* | 3/2016 | Kumar | G06F 3/017 345/156 |
| 2017/0068323 A1* | 3/2017 | West | G06F 3/017 |
| 2017/0236288 A1* | 8/2017 | Sundaresan | G06T 7/20 382/173 |
| 2019/0034076 A1* | 1/2019 | Vinayak | G06T 19/006 |

* cited by examiner

TELEPRESENCE FRAMEWORK FOR REGION OF INTEREST MARKING USING HEADMOUNT DEVICES

PRIORITY CLAIM

This U.S. patent application claims priority under 35 U.S.C. § 119 to: India Application No. 201721025858, filed on Jul. 20, 2017. The entire contents of the aforementioned application are incorporated herein by reference.

TECHNICAL FIELD

This disclosure relates generally to region of interest (ROI) marking, and, more particularly, to system and method for marking ROI in a media stream using touchless hand gesture interface such as head-mount devices.

BACKGROUND

Wearable Augmented Reality (AR) devices are being explored in many applications for visualizing real-time contextual information. For instance, said devices can be used in tele-assistance from remote sites when on-field operators require off-field expert's guidance for troubleshooting. Examples of applications requiring tele-assistance may include but are not limited to, troubleshooting a printer, video-conferencing, repair, maintenance and inspection in industries, wiring in aircraft, remote control of the machinery and so on.

Typical tele-assistance devices incorporate sophisticated algorithms and require large training sets that covers multiple ambient conditions (such as lighting conditions), multiple skin tones and complex environments for initial classifier. In addition, such devices take high computational time taken while testing, thereby increasing process latency.

SUMMARY

Embodiments of the present disclosure present technological improvements as solutions to one or more of the above-mentioned technical problems recognized by the inventors in conventional systems. For example, in one embodiment, a method for region of interest (ROI) marking in a media stream. The method for ROI marking in the media stream includes recognizing, via one or more hardware processors, a pointing object representative of a gesture in at least one frame of a media stream while capturing the media stream, wherein the media stream comprising a scene captured from a first person view (FPV) of a user. Further the method includes detecting, via the one or more hardware processors, locus of the pointing object in a set of frames subsequent to the at least one frame of the media stream to select a ROI in the media stream. The locus of the pointing object configures a bounding box around the ROI. Furthermore the method includes tracking, via the one or more hardware processors, the ROI in a plurality of frames of the media stream. The plurality of frames occurring subsequent to the set of subsequent frames in the media stream. Also, the method includes updating, via the one or more hardware processors, the bounding box around the ROI based on the tracking, wherein the updated bounding box encloses the ROI.

In another embodiment, a system for region of interest (ROI) marking in a media stream is provided. The system includes one or more memories; and one or more hardware processors, the one or more memories coupled to the at least one processor and the at least one media sensor wherein the at least one processor is capable of executing programmed instructions stored in the one or more memories to recognize a pointing object representative of a gesture in at least one frame of a media stream while capturing the media stream, wherein the media stream comprising a scene captured from a first person view (FPV) of a user. The one or more hardware processors are further configured by the instructions to detect locus of the pointing object in a set of frames subsequent to the at least one frame of the media stream to select a ROI in the media stream, wherein the locus of the pointing object configures a bounding box around the ROI. Furthermore, the one or more hardware processors are further configured by the instructions to track the ROI in a plurality of frames of the media stream, the plurality of frames occurring subsequent to the set of subsequent frames in the media stream. Also, the one or more hardware processors are further configured by the instructions to update the bounding box around the ROI based on the tracking, wherein the updated bounding box encloses the ROI.

In yet another embodiment, a non-transitory computer-readable medium having embodied thereon a computer program for executing a method for ROI marking in the media stream is provided. The method includes recognizing a pointing object representative of a gesture in at least one frame of a media stream while capturing the media stream, wherein the media stream comprising a scene captured from a first person view (FPV) of a user. Further, the method includes detecting locus of the pointing object in a set of frames subsequent to the at least one frame of the media stream to select a ROI in the media stream. The locus of the pointing object configures a bounding box around the ROI. Furthermore the method includes tracking the ROI in a plurality of frames of the media stream. The plurality of frames occurring subsequent to the set of subsequent frames in the media stream. Also, the method includes updating the bounding box around the ROI based on the tracking, wherein the updated bounding box encloses the ROI.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
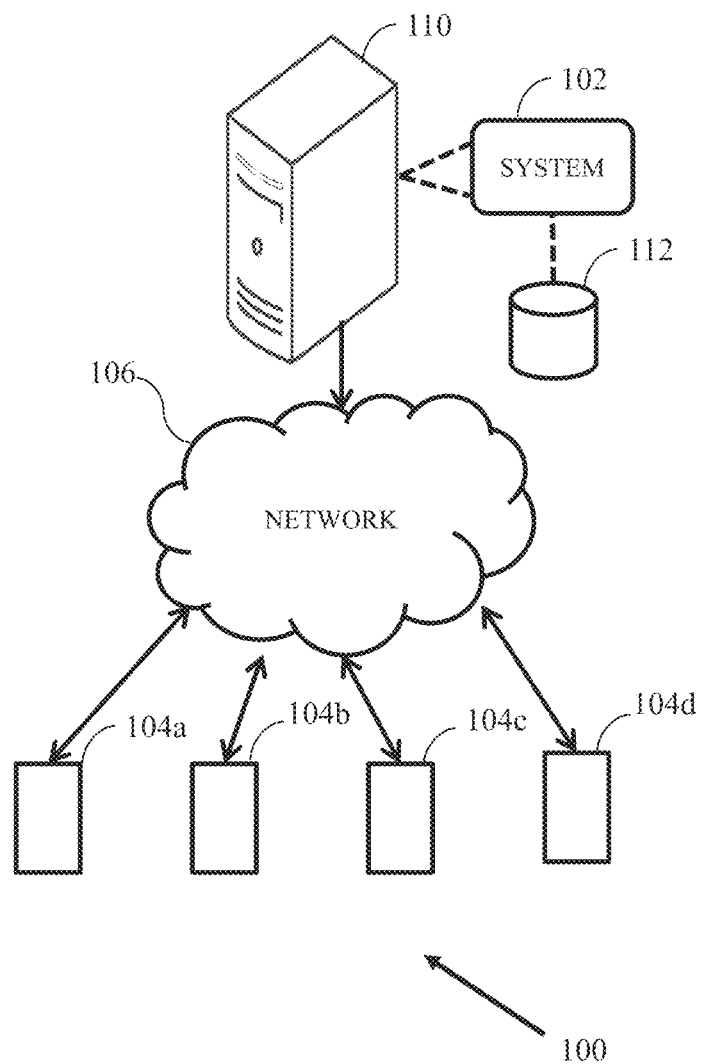
FIG. 1 illustrates a network implementation of system for ROI marking in a media stream, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Augmented reality refers to representation of a view of physical, real-world environment whose elements are augmented by computer-generated sensory input such as sound, text, graphics, or video. AR is useful in various applications such as medical, education, entertainment, military, and so on. One such AR application can be providing tele-assistance from remote sites when on-field operators require off-field expert's guidance for trouble-shooting. Examples of such application involving expert's guidance for trouble-shooting may include, but are not limited to, trouble-shooting a printer, video-conferencing system, repair, maintenance and inspection in industries, wiring in aircraft, and so on.

In typical scenarios involving experts for trouble-shooting, the on-field operator is required to provide remote assistance and remote scene exploration to the off-field experts. Alternatively, the expert is expected to travel to the field location for trouble-shooting. Either of the solutions involves longer durations till actual trouble-shooting. Additionally, traveling to the field locations involve high costs of having the expert on the site and also long downtimes due to travel.

In order to meet the challenge of such conventional practises, various tele-assistance frameworks for remote assistance have been proposed. For example, one such tele-assistance framework embodies client-server architecture of a multi-user wearable device to support operators and enhance the assistance of visualisation experts. Participants can see the same spatially aligned model while independently controlling virtual content in their Field of View (FoV). Other conventional systems allows remote expert to work with user's traditional tools and overlay virtual objects in user's FoV through a computer interface using a wearable device. However, such traditional systems are not capable of providing requisite interface and functionality to collaborate and work efficiently. For example, such systems are not capable of highlighting a region of interest (ROI) in the FoV while viewing from a wearable device. Moreover, since the user performs the tasks wearing Head Mounted Device (HMD) or a wearable, providing an additional hardware amounts to increased cost and complexity.

Certain conventional systems are capable of recognizing hand gestures through a wearable. However, such systems employ depth sensors for recognition of hand gestures, thereby increasing the overall cost of the system. Recognizing hand gestures from single monocular RGB data captured from FPV is a challenging task in computer vision as smartphones are not equipped with depth sensors. Certain conventional systems employs techniques such as random forest super pixel classification for hand segmentation in egocentric videos, effective skin pixel extraction using Gaussian mixture mode, four stage approach for hand gesture recognition which does hand-presence detection followed by segmentation using a Bayesian approach, and so on. While the above mentioned techniques provides for sophisticated detection and tracking; they are computationally heavy and difficult to port on a smartphone.

A typical tele-assistance framework may involve an expert personnel present at a server location, assisting the novice inspector at a remote location, by observing the video stream sent from user's head mount to the server via a network. The inspector at the remote location may communicate via audio with the expert personnel to appraise about the condition. Moreover, in addition to sharing the user's field of view (FoV) with the remote expert, it is also necessary to provide the expert and worker with right interface and functionality to collaborate and work efficiently. Conventional systems utilize telepointer to highlight region in a trouble shooting application, for example a wearable video conferencing system. Other conventional systems, such as GestureCam, are capable of capturing expert hand gestures on touch screen device and sending the same to user's wearable. However, such systems lack functionality of highlighting the ROI from a wearable device.

Touchless hand gestures are more effective to highlight the ROI in industrial outdoor setting. This helps the expert in understanding the problem and assists the on-site inspector via audio/text instructions, so as to solve the desired task accurately and quickly. Currently, various high-end sophisticated AR gadgets, such as Microsoft Hololens, Daqri smart helmet, and so on are available. However such gadgets are not economically viable, portable and scalable to mass market. Recognizing hand gestures from single monocular RGB data captured from First Person View (FPV) can be a challenging task in computer vision as smartphones are not equipped with depth sensors. Various conventional systems are available that utilize sophisticated techniques such as random forest super pixel classification for hand segmentation in egocentric videos, effective skin pixel extraction using Gaussian mixture model, and so on. While conventional methods and systems disclose sophisticated detection and tracking; they are computationally heavy and difficult to port on a portable electronic device such as a smartphone.

Various embodiments disclosed herein provides methods and system that are capable of ROI tracking with wearables in a computationally economical manner by considering factors such as real-time performance, accuracy, usability and latency of algorithm on electronic device such as smartphone. For example, in one embodiment, the disclosed system is capable of being integrated with frugal smartphone based head mount devices so as to localize/select the ROI in a first person view (FPV). The region selected using freehand sketching gestures is highlighted to the remote server setup for expert's advice. An important contribution of the disclosed system and method is enabling touchless finger based gesture recognition that can be executed on smartphones, and can be used with wearable frugal head mount devices. Using the stereo-rendering of camera feed and overlaying the related information on the smartphone screen, these devices can be extended to AR applications. Examples of such frugal head mount devices may include but are not limited to, Google Cardboard/Wearality, and so on. Additionally, the disclosed system is capable of reducing network latency and achieving real-time performance by on-board implementation of a ROI recognition module.

The embodiments herein and the various features and advantageous details thereof are explained more fully with reference to the non-limiting embodiments that are illustrated in the accompanying drawings and detailed in the following description. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The methods and systems are not limited to the specific embodiments described herein. In addition, the method and system can be practiced independently and separately from other modules and methods described herein. Each device element/module and method can be used in combination with other elements/modules and other methods.

The manner, in which the system and method for region of interest (ROI) marking using head-mount devices shall be implemented, has been explained in details with respect to the FIGS. 1 through 5. While aspects of described methods and systems for ROI marking using head-mount devices can be implemented in any number of different systems, utility environments, and/or configurations, the embodiments are described in the context of the following exemplary system(s).

Figure 2:
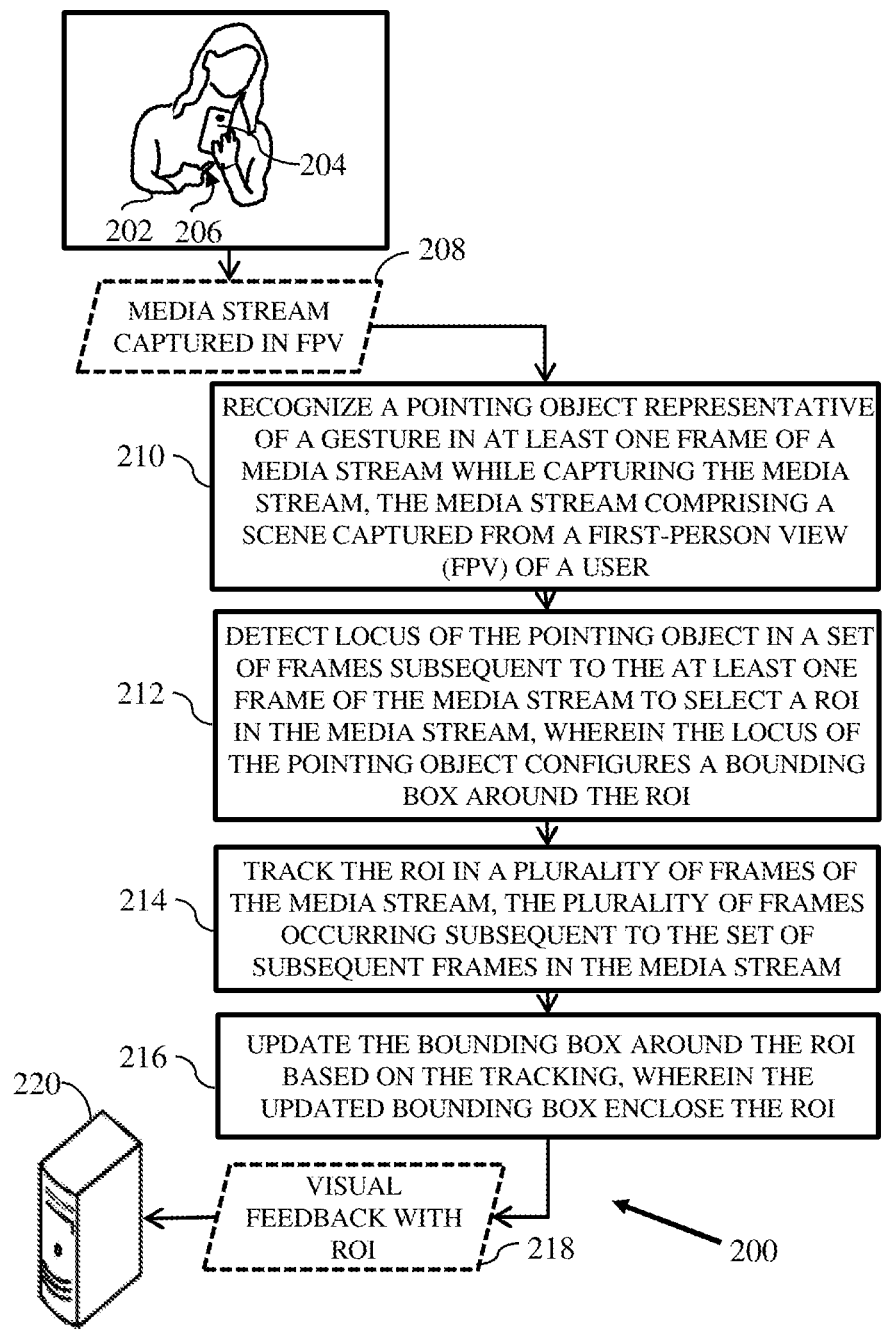
FIG. 2 illustrates a representative process flow for ROI marking in a media stream, according to some embodiments of the present disclosure.

Referring now to FIG. 1, a network implementation 100 of system 102 for ROI marking in media stream using head-mount devices is illustrated, in accordance with an embodiment of the present subject matter. In one embodiment, the system 102 facilitates marker-less and real-time two stage sequential gesture recognition method to highlight the ROI in the user's field of view (FOV). The system 102 detects a dynamic gesture. In an example embodiment, the detection of dynamic gesture includes detecting the presence of a stable hand, followed by raising the index finger while rest of the fist is closed (termed as point gesture). The dynamic gesture of the present embodiment is shown in FIG. 2. It will be noted that the gesture shown and described herein is an example gesture. The ROI marking using head-mount devices can be implemented via various other gestures known in art, without limiting the gesture described herein. The gesture is configured to trigger ROI selection. A second dynamic gesture may trigger ROI tracking. For example, the second gesture may include moving point gesture around the object of interest. Thus, the system may perform the steps of: (i) point gesture detection, (ii) ROI selection, (iii) ROI tracking, and (iv) Subsequent updating of bounding box around the ROI. The method of ROI marking using head-mount devices is described further in detail with reference to FIGS. 2-5.

Although the present subject matter is explained considering that the system 102 is implemented for ROI marking using head-mount devices, it may be understood that the system 102 may is not restricted to any particular machine or environment. The system 102 can be utilized for a variety of domains where industrial assembly and maintenance operations are involved. The system 102 may be implemented in a variety of computing systems, such as a laptop computer, a desktop computer, a notebook, a workstation, a mainframe computer, a server, a network server, and the like.

Herein, the system 102 may capture the media stream, for example, images via multiple devices and/or machines 104-1, 104-2 . . . 104-N, collectively referred to as devices 104 hereinafter. Examples of the devices 104 may include, but are not limited to, a portable computer, a personal digital assistant, a handheld device, VR camera embodying devices, storage devices equipped to capture and store the images/videos, and so on. In an embodiment, the devices 104 may include devices capable of capturing the videos, for example, augmented reality (AR) based videos of objects and/or machines. The devices 104 are communicatively coupled to the system 102 through a network 106, and may be capable of transmitting the captured videos to the system 102.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

The devices 104 may send the media stream to the system 102 via the network 106. The system 102 is caused to enable marking ROI in the media stream captured by the AR devices such as the devices 104. Herein, the AR devices are the devices that may embody AR technologies. AR technologies enhance user's perception and help the user to see, hear, and feel the environments in enriched ways. With the use of AR devices, ROI selection of the desired object is facilitated by means of a natural user interface.

In an embodiment, the system 102 may be embodied in a computing device 110. Examples of the computing device 110 may include, but are not limited to, a desktop personal computer (PC), a notebook, a laptop, a portable computer, a smart phone, a tablet, and the like. The system 102 may also be associated with a data repository 112 to store the media stream. Additionally or alternatively, the data repository 112 may be configured to store data and/or information generated during ROI marking in the media stream. The repository 112 may be configured outside and communicably coupled to the computing device 110 embodying the system 102. Alternatively, the data repository 112 may be configured within the system 102. An example implementation of the system 102 for ROI marking in the media stream is described further with reference to FIG. 2.

Figure 4A:
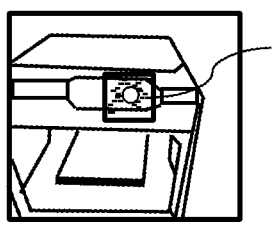
FIGS. 4A-4D illustrates a process flow for ROI tracking in order to perform ROI marking, according to some embodiments of the present disclosure.
Figure 4B:
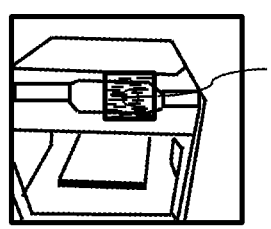
Figure 4C:
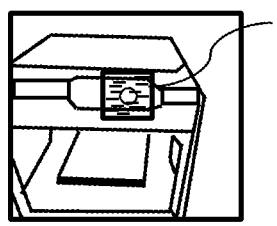
Figure 4D:
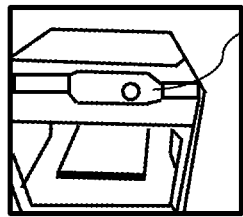
Figure 5:
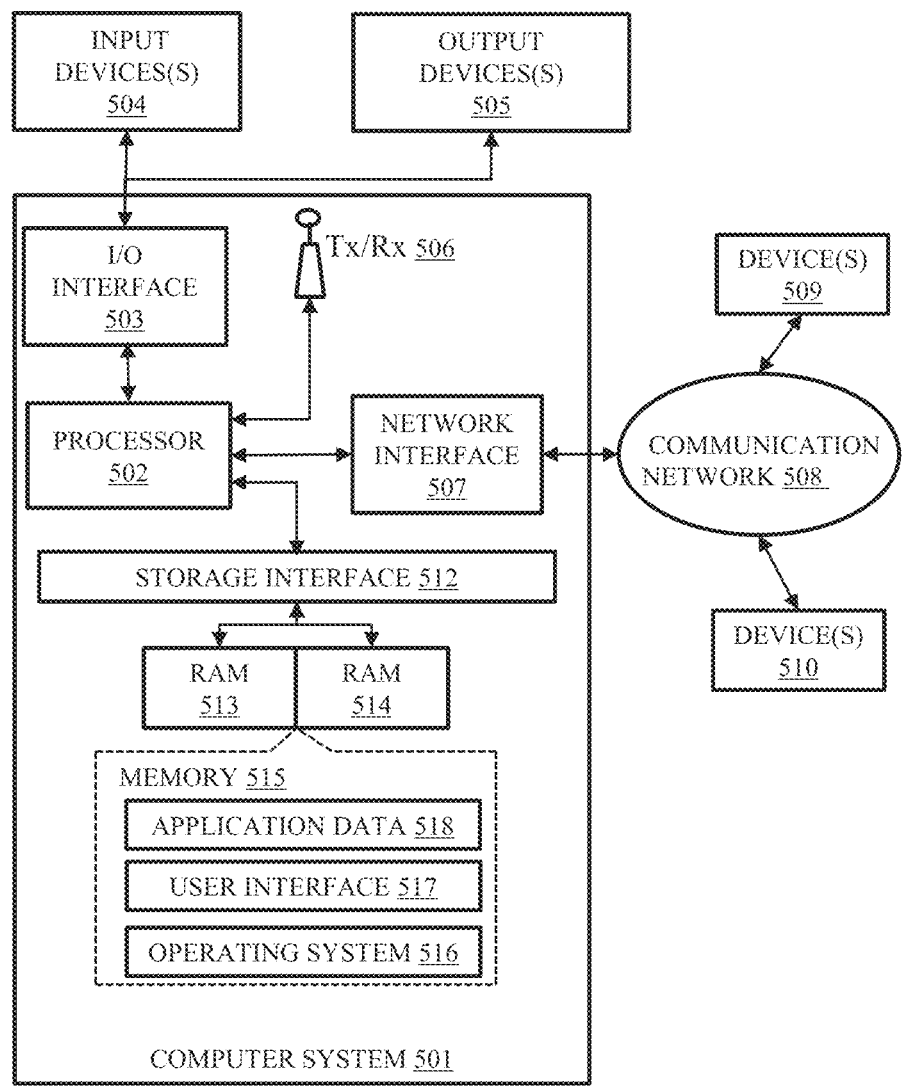
FIG. 5 is a block diagram of an exemplary computer system for implementing embodiments consistent with the present disclosure.

FIG. 2 illustrates an exemplary method 200 for ROI marking using head-mount devices according to some embodiments of the present disclosure. The method 200 may be described in the general context of computer executable instructions. Generally, computer executable instructions can include routines, programs, objects, components, data structures, procedures, modules, functions, etc., that perform particular functions or implement particular abstract data types. The method 200 may also be practiced in a distributed computing environment where functions are performed by remote processing devices that are linked through a communication network. The order in which the method 200 is described is not intended to be construed as a limitation, and any number of the described method blocks can be combined in any order to implement the method 200, or an alternative method. Furthermore, the method 200 can be implemented in any suitable hardware, software, firmware, or combination thereof. In an embodiment, the method 200 depicted in the flow chart may be executed by a system, for example, the system 102 of FIG. 1. In an example embodiment, the system 102 may be embodied in an exemplary computer system, for example computer system 501 (FIG. 5). The method 200 of FIG. 2 will be explained in more detail below with reference to FIGS. 3A-4D.

Figure 3A:
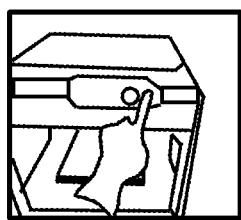
FIGS. 3A-3F illustrates a process flow for ROI selection in order to perform ROI marking, according to some embodiments of the present disclosure.

Referring to FIG. 2, in the illustrated embodiment, the method 200 is initiated when a user 202 holds a wearable 204, for example a head-mount device and a smartphone (hereinafter collectively referred to as a AR wearable device) for performing ROI marking in an AR scene rendered by the AR wearable device. The user 202 can perform a gesture, for example, gesture 206, to select a ROI in the AR scene. In an embodiment, the gesture may include a dynamic gesture which involves detecting the presence of a stable hand, followed by raising the index finger while rest of the fist closed. Such a gesture may be termed as point gesture. An example of point gesture is illustrated in FIG. 3A. The point gesture refers to a gesture of pointing a finger to detect a dynamic gesture (FIG. 3A) for triggering ROI selection. Alternately, the gesture may be any known gesture that can facilitate in selection of the ROI.

One or more images/frames of the media stream having a pointing object representative of the gesture are obtained from the AR wearable device. The media stream includes a scene captured from a first person view (FPV) of the user. Said images captured in FPV are streamed for processing to the system (for example, the system 102 of FIG. 1), at 208. In an implementation, the images obtained from the AR wearable device are first down-scaled, for example to a resolution of 640×480, to reduce the processing time, without compromising much on image quality. For example, an RGB Image frame illustrated in FIG. 3A may be acquired from an AR wearable device 204.

Figure 3B:
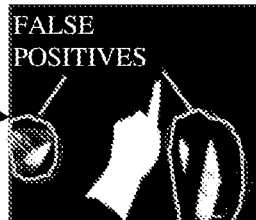

At 210, the pointing object representative of the gesture is recognized in at least one frame of the media stream while capturing the media stream using a media capturing device. In an embodiment, recognizing the pointing object includes deriving chroma channel information from the media stream. In particular, the images are processed to detect skin pixels (for example, as illustrated in FIG. 3B), for example skin pixels associated with the fingertip of the user. In an embodiment, to detect a fingertip of the user making the gesture, the system may utilize Chroma channel information for skin pixel detection models, thereby making the hand detection process illumination invariant. Equation 1 below describes the Chroma range that can used for segmenting the hand region from the background scene:

$$77 < C_b < 127$$

$$133 < C_r < 173, \quad (1)$$

where Cb and Cr represents chroma components.

Figure 3C:
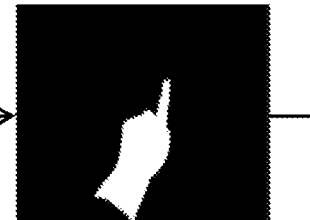
Figure 3F:
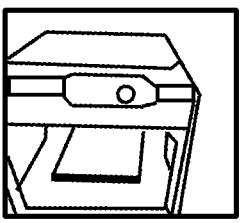
Figure 3E:
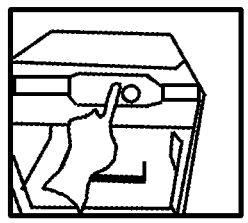

Based on the chroma channel information, the pointing object is segmented from a background scene captured in the media stream. Herein, the objective is gesture recognition from FPV, hence the user's hand region may be the most prominent object present in user's FoV. The system, for example the system 102 may retain largest blob which covers a significant part of hand region by contour segmentation, using topological structural analysis of digitized binary images by border following algorithm. This step effectively removes all the skin-like background objects segmented in the previous step, as shown in FIG. 3C. The binary mask from contour extraction is combined with the original image to produce the segmented hand region, which can be further used to recognize the point gesture.

In an example implementation, Point Gesture for ROI highlighting is initialized after the following conditions are satisfied:
1. The hand region should occupy at least 12% of the FOV which is empirically determined on the basis of the distance of the user's hand from the wearable. This helps in avoiding false detection of skin-like blobs.
2. The steady hand is detected by observing centroid of the blob within certain radius for short duration. This is followed by user raising his index finger to highlight the ROI. Herein, highlighting the ROI may include creating a contour in the scene rendered on the wearable device by using the touchless hand gesture. The distance of the farthest point (fingertip) from the centroid is tracked and the gradual increase in this distance is verified to qualify foreground contour to be a point gesture.

Figure 3D:
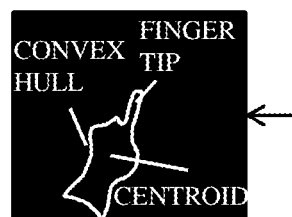

The point gesture recognition may trigger a ROI selection. A locus of the pointing object is detected in a set of frames subsequent to the at least one frame of the media stream to select a ROI in the media stream, at 212. Herein, the locus of the pointing object configures a bounding box around the ROI. In an embodiment, the system performs fingertip detection on subsequent frames and draws an approximated bounding box around the object of interest following the locus of detected fingertips. Fingertip detection is performed by computing convex hull of foreground hand contour (as shown in FIG. 3C, 3D) using the Sklansky's algorithm and convexity defects (comprises of start, end and defect points). A start or end point which (i) is farthest from centroid of the convex hull, and (ii) lies above the centroid (avoids false positives), qualifies to be fingertip. The same conditions are verified for subsequent frames and fingertip locus is stored. Since free-form drawing might look cluttered, it is approximated by superimposing the bounding box over the ROI. The point gesture recognition is followed for subsequent frames to compute the fingertip location. The false positive (or outlier) fingertip detections which can distort ROI are eliminated by thresholding the distance between consecutive frames detections. The distance is empirically determined and set to, for example 100 pixels. This distance is observed over subsequent frames and when it decreases gradually, ROI is assumed to be near to completion and an up-right approximated bounding box is fitted over fingertip locus. In an embodiment, the locus is stored in the repository associated with the system.

At 214, the method includes tracking the ROI in a plurality of frames of the media stream occurring subsequent to the set of subsequent frames in the media stream. Robust tracking of the marked ROI is an important challenge for a comfortable user experience at the remote site.

In an embodiment, tracking the ROI in the plurality of frames includes determining a plurality of feature points associated with the ROI in the frames of plurality of frames. For example, Shi-Tomasi feature points may be utilized for representing the marked ROI which is tracked in the subsequent frames using forward-backward (FB) error method. Referring to FIG. 4A, highlighted region and key Shi-Tomasi feature points (marked as 402) determined on it are illustrated. Further, said feature points are tracked every subsequent nth frame from the first frame. For example, said feature points are tracked every 3rd frame to reduce the processing time using Lucas-Kanade optical flow with pyramidal approach. Optical flow trajectories of the feature points are determined on the subsequent nth frames. FIGS. 4B, 4C shows the optical flow trajectories (marked as 406, 408 respectively) of the feature points on the subsequent frames. In order to improve the accuracy of tracking, Forward-Backward error method is employed, wherein the feature points are tracked twice, firstly from the previous image to the current image (forward in time) which yields a point set Pf, and then from the current image to the previous image, using Pf set to yield a point set Pb. The points from the previous frame are used as validation points. The FB error is defined as the distance between these two tracking trajectories. In an embodiment, the Euclidean distance can be used to determine the error, $$D(Pf, Pb) = \|xf(i) - xb(i)\|$$

The displacements that may be with a threshold range of pixels, for example within 5 pixels, are considered as the reliable point trajectories and the corresponding forward tracked point may be marked as inlier. Bounding box may then be drawn onto the reliable point set thus obtained, thereby filtering out the noisy feature points. It will be noted herein that the disclosed application scenario may not have abrupt motion unless the user's object of interest is changed. FB error is an efficient method to deal with small motion and requires less computing resource. At 216, the bounding box may be updated based on the tracking. For example as illustrated in FIG. 4D, the updated bounding box 410 is approximated over the ROI. Herein, the updated bounding box 410 encloses the ROI. At 218, a visual feedback along with the ROI marking is provided to a server set-up 220 for expert tele-assistance.

FIG. 5 is a block diagram of an exemplary computer system 501 for implementing embodiments consistent with the present disclosure. The computer system 501 may be implemented in alone or in combination of components of the system 102 (FIG. 1). Variations of computer system 501 may be used for implementing the devices included in this disclosure. Computer system 501 may comprise a central processing unit ("CPU" or "hardware processor") 502. The hardware processor 502 may comprise at least one data processor for executing program components for executing user- or system-generated requests. The processor may include specialized processing units such as integrated system (bus) controllers, memory management control units, floating point units, graphics processing units, digital signal processing units, etc. The processor may include a microprocessor, such as AMD Athlon™, Duron™ or Opteron™, ARM's application, embedded or secure processors, IBM PowerPC™, Intel's Core, Itanium™, Xeon™, Celeron™ or other line of processors, etc. The processor 502 may be implemented using mainframe, distributed processor, multi-core, parallel, grid, or other architectures. Some embodiments may utilize embedded technologies like application specific integrated circuits (ASICs), digital signal processors (DSPs), Field Programmable Gate Arrays (FPGAs), etc.

Processor 502 may be disposed in communication with one or more input/output (I/O) devices via I/O interface 503. The I/O interface 503 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.11 a/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 503, the computer system 501 may communicate with one or more I/O devices. For example, the input device 504 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc.

Output device 505 may be a printer, fax machine, video display (e.g., cathode ray tube (CRT), liquid crystal display (LCD), light-emitting diode (LED), plasma, or the like), audio speaker, etc. In some embodiments, a transceiver 506 may be disposed in connection with the processor 502. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 502 may be disposed in communication with a communication network 508 via a network interface 507. The network interface 507 may communicate with the communication network 508. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 508 may include, without limitation, a direct interconnection, local area network (LAN), wide area network (WAN), wireless network (e.g., using Wireless Application Protocol), the Internet, etc. Using the network interface 507 and the communication network 508, the computer system 501 may communicate with devices 509 and 510. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 501 may itself embody one or more of these devices.

In some embodiments, the processor 502 may be disposed in communication with one or more memory devices (e.g., RAM 513, ROM 514, etc.) via a storage interface 512. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc. Variations of memory devices may be used for implementing, for example, any databases utilized in this disclosure.

The memory devices may store a collection of program or database components, including, without limitation, an operating system 516, user interface application 517, user/application data 518 (e.g., any data variables or data records discussed in this disclosure), etc. The operating system 516 may facilitate resource management and operation of the computer system 501. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 517 may facilitate display, execution, interaction, manipulation, or operation of program components through textual or graphical facilities. For example, user interfaces may provide computer interaction interface elements on a display system operatively connected to the computer system 501, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, computer system 501 may store user/application data 518, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of any computer or database component may be combined, consolidated, or distributed in any working combination.

Additionally, in some embodiments, the server, messaging and instructions transmitted or received may emanate from hardware, including operating system, and program code (i.e., application code) residing in a cloud implementation. Further, it should be noted that one or more of the systems and methods provided herein may be suitable for cloud-based implementation. For example, in some embodiments, some or all of the data used in the disclosed methods may be sourced from or stored on any cloud computing platform.

Various embodiments disclose an AR tele-presence framework for highlighting the region of interest from the wearable. The disclosed framework includes a system for touch-less gesture recognition on a smartphone with a wearable such as Google cardboard in a dynamic background setting. This can enable wider reach of frugal head-mount devices such as Google Cardboard for AR. Real-time performance is achieved by implementing gesture recognition module on-board.

The disclosed AR framework facilitates ROI selection of the desired object using a natural user interface. The AR system in which the user, via freeform air gestures, can select an object onto which a bounding box is then superimposed. As a result, it is particularly suitable for applications with dense targets and rich visual elements. Since the disclosed system uses simpler skin based model to achieve real-time performance, the necessity of a large training set that covers multiple lighting conditions, multiple skin tones and complex environments for the initial classifier, is precluded. Moreover, the computational time taken while testing is reduced.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor-implemented method for region of interest (ROI) marking in a media stream, the method comprising:

recognizing, via one or more hardware processors, a pointing object representative of a hand gesture in at least one frame of a media stream while capturing the media stream using an Augmented Reality (AR) wearable, wherein the AR wearable comprises a head-mount device and a smartphone, the media stream comprising a scene captured from a first person view (FPV) of a user, wherein the pointing object comprises a fingertip of the user;

detecting, via the one or more hardware processors, locus of the pointing object in a set of frames subsequent to the at least one frame of the media stream to select a ROI in the media stream, wherein the locus of the pointing object configures a bounding box around the ROI, wherein detecting the locus of the pointing object in the set of frames comprises detecting the fingertip in the set of frames, wherein the detection of the fingertip is performed on subsequent frames of the set of frames that are separated by a threshold distance, and wherein detecting the fingertip in a frame of the set of frames comprises:

computing convex hull of foreground hand contour associated with the pointing object using a Sklansky's algorithm and start and end points of the pointing object; and identifying one of a start and end point as fingertip which is farthest from centroid of the convex hull, and lies above the centroid of the convex hull, wherein a path of the fingertip detected in the set of frames constitutes the locus;

tracking, via the one or more hardware processors, the ROI in a plurality of frames occurring subsequent to the set of subsequent frames in the media stream; and updating, via the one or more hardware processors, the bounding box around the ROI based on the tracking, wherein the updated bounding box encloses the ROI.

2. The method of claim 1, wherein recognizing the pointing object comprises:

deriving chroma channel information from the media stream; and segmenting the pointing object from a background scene captured in the media scene by using the chroma channel information, wherein a chroma range associated with the chroma channel information used for segmenting comprises:

$77<Cb<127$ $133<Cr<173.$

3. The method of claim 1, further comprising storing the locus.

4. The method of claim 1, wherein tracking the bounding box comprises:

determining a plurality of feature points associated with the ROI in at least one frame of plurality of frames;

tracking said plurality of feature points in every subsequent nth frame from the at least one frame; and determining optical flow trajectories of the plurality of feature points on the subsequent nth frames to track the bounding box.

5. The method of claim 4, wherein the optical flow trajectories are determined using Lucas-Kanade optical flow with pyramidal approach.

6. The method of claim 4, further comprising filtering noisy feature points from the plurality of feature points.

7. The method of claim 6, wherein the noisy feature points are filtered by determining Forward-Backward error, and wherein determining Forward-Backward error comprises:

tracking feature points from a previous frame to a current frame (forward in time) of the plurality of frames to yield a first trajectory of point set (Pf);

tracking feature points from the current image to the previous image, using Pf set to yield a second trajectory of point set (Pb);

determining the Forward-Backward error by measuring a distance between the first trajectory and the second trajectory using the equation:

$D(Pf;Pb)=\|xf(i)-xb(i)\|,$ wherein the distance comprises a Euclidean distance.

8. A system for region of interest (ROI) marking in a media stream, the system comprising:

one or more memories; and one or more hardware processors, the one or more memories coupled to the one or more hardware processors, wherein the one or more hardware processors are capable of executing programmed instructions stored in the one or more memories to:

recognize a pointing object representative of a hand gesture in at least one frame of a media stream while capturing the media stream using an Augmented Reality (AR) wearable, wherein the AR wearable comprises a head-mount device and a smartphone, the media stream comprising a scene captured from a first person view (FPV) of a user wherein the pointing object comprises a fingertip of the user;

detect locus of the pointing object in a set of frames subsequent to the at least one frame of the media stream to select a ROI in the media stream, wherein the locus of the pointing object configures a bounding box around the ROI, wherein to detect the locus of the pointing object in the set of frames, the one or more hardware processors are further configured by the instructions to detect the fingertip in subsequent frames of the set of frames that are separated by a threshold distance, and wherein to detect the fingertip in a frame of the set of frames, the one or more hardware processors are further configured by the instructions to:

compute convex hull of foreground hand contour associated with the pointing object using a Sklansky's algorithm and start and end points of the pointing object;

identify one of a start and end point as fingertip which is farthest from centroid of the convex hull, and lies above the centroid of the convex hull, wherein a path of the fingertip detected in the set of frames constitutes the locus;

track the ROI in a plurality of frames occurring subsequent to the set of subsequent frames in the media stream; and update the bounding box around the ROI based on the tracking, wherein the updated bounding box encloses the ROI.

9. The system of claim 8, wherein to recognize the pointing object, the one or more hardware processors are further configured by the instructions to:

derive chroma channel information from the media stream; and segment the pointing object from a background scene captured in the media scene by using the chroma channel information, wherein a chroma range associated with the chroma channel information used for segmenting comprises:

$77<Cb<127$ $133<Cr<173.$

10. The system of claim 8, wherein the one or more hardware processors are further configured by the instructions to store the locus.

11. The system of claim 8, wherein to track the bounding box, the one or more hardware processors are further configured by the instructions to:

determine a plurality of feature points associated with the ROI in at least one frame of plurality of frames;

track said plurality of feature points in every subsequent nth frame from the at least one frame; and determine optical flow trajectories of the plurality of feature points on the subsequent nth frames to track the bounding box.

12. The system of claim 11, wherein the one or more hardware processors are further configured by the instructions to determine the optical flow trajectories using Lucas-Kanade optical flow with pyramidal approach.

13. The system of claim 11, wherein the one or more hardware processors are further configured by the instructions to filter noisy feature points from the plurality of feature points.

14. The system of claim 13, wherein the one or more hardware processors are further configured by the instructions to filter the noisy feature points by determining Forward-Backward error, and wherein to determine the forward-backward error, the one or more hardware processors are further configured by the instructions to:
- track feature points from a previous frame to a current frame (forward in time) of the plurality of frames to yield a first trajectory of point set (Pf);
- track feature points from the current image to the previous image, using Pf set to yield a second trajectory of point set (Pb);
- determine the Forward-Backward error by measuring a distance between the first trajectory and the second trajectory using the equation:

$$D(Pf;Pb)=\|xf(i)-xb(i)\|,$$

wherein the distance comprises a Euclidean distance.

15. A non-transitory computer-readable medium having embodied thereon a computer program for executing a method for region of interest (ROI) marking in a media stream, the method comprising:
- recognizing, via one or more hardware processors, a pointing object representative of a hand gesture in at least one frame of a media stream while capturing the media stream using an Augmented Reality (AR) wearable, wherein the AR wearable comprises a head-mount device and a smartphone, the media stream comprising a scene captured from a first person view (FPV) of a user, wherein the pointing object comprises a fingertip of the user;
- detecting, via the one or more hardware processors, locus of the pointing object in a set of frames subsequent to the at least one frame of the media stream to select a ROI in the media stream, wherein the locus of the pointing object configures a bounding box around the ROI, wherein detecting the locus of the pointing object in the set of frames comprises detecting the fingertip in the set of frames, wherein the detection of the fingertip is performed on subsequent frames of the set of frames that are separated by a threshold distance, and wherein detecting the fingertip in a frame of the set of frames comprises:
  - computing convex hull of foreground hand contour associated with the pointing object using a Sklansky's algorithm and start and end points of the pointing object; and
  - identifying one of a start and end point as fingertip which is farthest from centroid of the convex hull, and lies above the centroid of the convex hull, wherein a path of the fingertip detected in the set of frames constitutes the locus;
- tracking, via the one or more hardware processors, the ROI in a plurality of frames occurring subsequent to the set of subsequent frames in the media stream; and
- updating, via the one or more hardware processors, the bounding box around the ROI based on the tracking, wherein the updated bounding box encloses the ROI.

* * * * *